United States Patent Office 3,166,543
Patented Jan. 19, 1965

3,166,543
PROCESS FOR POLYMERIZING OLEFINS
Adam Orzechowski, Waltham, and James C. MacKenzie, Wellesley Hills, Mass., assignors to Cabot Corporation, Boston, Mass., a corporation of Delaware
No Drawing. Filed Aug. 1, 1962, Ser. No. 213,872
18 Claims. (Cl. 260—93.7)

This invention relates to the polymerization and copolymerization of mono-olefins and di-olefins such as ethylene, propylene, butene-1, styrene, isoprene and butadiene.

This case is a continuation in part of a copending application, Serial No. 11,961, filed March 1, 1960, by Orzechowski and MacKenzie.

It is a principal object of the present invention to provide a novel process for polymerizing mono- and di-olefins and mixtures thereof.

Other objects of the present invention will in part be obvious and will in part appear hereinafter.

The aforementioned application discloses novel catalyst components suitable for use in the polymerization and copolymerization of mono- and di-olefins, which components comprise the product of the metathetical reaction carried out under certain conditions between a halide-type compound of a group IVa, Va, VIa, VIIa or period 4 of group VIII metal and hydroxyl groups on the surface of a finely divided carbon black. In accordance with the present invention, it was discovered that excellent catalysts for the polymerization of mono- and di-olefins are formed when said catalyst components are heated in the presence of certain silane compounds to temperatures above about 100° C. and preferably above about 140° C. The polymerization or copolymerization of the mono- and di-olefins can be effected at suitable temperatures within the range of from about —25° C. to about 250° C., and pressures ranging upwardly from above about 50 p.s.i.g. to any desired maximum pressure, for example, 30,000 p.s.i.g. or even higher pressures.

Carbon blacks suitable for the purposes of the present invention generally include any carbon black with hydroxyl groups on the surface thereof. For example, the channel carbon blacks and furnace carbon blacks are all generally suitable for the purposes of the present invention. Definitely preferred, however, are those finely divided carbon blacks having a hydroxyl group content on the surface thereof of above about 0.5 milliequivalents per gram.

Halide-type compounds of groups IVa, Va, VIa, VIIa and period 4 of group VIII metals (hereinafter generally referred to as transition metal halides) suitable for the purposes of the present invention are the compounds conforming to the general empirical formula:

$$TO_aX_b$$

wherein T is a metal of group IVa, Va, VIa, VIIa or period 4 of group VII (where the group numbers correspond to the Mendeleev Periodic System); O is oxygen; $a$ equals 0 or 1; each X is any halogen; and $b$ is an integer from 1 to 7.

Examples of suitable compounds conforming to the general formula are halides of groups IVa, Va, VIa, VIIa and period 4 of group VIII metals such as titanium tetrachloride, zirconium tetrachloride, vanadium tetrachloride, titanium tetraiodide, chromium trichloride, tantalum pentabromide, molybdenum pentachloride, cobaltous bromide, and oxylhalides of groups IVa, Va, VIa, VIIa and period 4 of group VIII metals such as vanadium oxychloride and chromium oxychloride.

The conditions under which reaction between the transition metal halide and the finely divided carbon black can be accomplished are subject to considerable variation. However, in order to obtain a catalyst component with exceptionally high activity and reproducible character, it has been found to be all important that the carbon black be essentially dry and anhydrous (i.e. free of molecular water in any form) at the time it is brought into contact with the transition metal halide. In addition, it is recommended that said reaction be achieved so as to allow by-products of the reaction (for example HCl) to be eliminated from the reaction zone in order to insure that said reaction goes to completion. Generally, said reaction can be carried out by contacting the carbon black with said transition metal halide, preferably in a solution thereof in an inert hydrocarbon medium, and maintaining the two reactants in intimate contact for a period of time sufficient to effect the desired chemical reaction resulting in the chemical bonding of the transition metal to the carbon black. The length of time required to effect a given amount of such reaction and chemical bonding is largely dependent upon the temperature of the reaction mixture. Generally speaking, almost any temperature between about 0° C. and 300° C. can be used satisfactorily, but room temperature to about 105° C. is generally definitely preferred. Assuming provision is made for intimate contact of the dry carbon black and the transition metal halide, the minimum time required to accomplish the chemical reaction needed will vary from periods of about 10 hours at room temperature to periods of about 15 minutes at temperatures of 105° C. or over. Temperatures higher than a few hundred degrees centigrade, e.g., 500° C., are completely needless and therefore of little or no interest.

Elimination of by-products of the reaction from the reaction zone, i.e., the reaction medium, can be accomplished in many ways such as sweeping the reaction vessel with an inert gas, by carrying out the reaction at sufficiently elevated temperatures to drive by-products out of the reaction zone, i.e., usually out of the reaction medium, or by complexing or reacting said by-products with suitable substances such as tertiary amines, tertiary arsines, tertiary phosphines, terpenes, terpinenes, tetra-substituted hydrazines, carbides such as calcium carbide, and other substances such as sodium hydride which will react or complex with said by-products and thereby eliminate them.

Although use of the transition metal halide in liquid or solution form gives excellent results, reaction of said metal halide with the carbon black can be effected if the latter is exposed to vapors of said metal halide at a temperature of from about 20° C. to about 100° C., for at least about 15 minutes at 100° C., the lower being the temperature utilized, the longer being the time required. Said vapors can be supplied under their own vapor pressure using a partial vacuum if necessary, or with the aid of a dry inert carrier gas such as nitrogen. This vapor phase treatment can be accomplished in any suitable manner such as by circulating the vapors through the particulate carbon black in a fixed, moving or fluidized bed reactor.

Silane compounds suitable for the purposes of the present invention are any of the compounds conforming to the empirical formula:

$$R_nH_mSiO_{\frac{4-(m+n)}{2}}$$

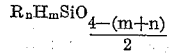

wherein each R is chosen from the group consisting of monovalent hydrocarbon radicals, monovalent alkoxy radicals, monovalent aryloxy radicals and the halogens; $n$ is 0, 1, 2 or 3; each H is a hydride radical; $m$ is 1, 2, 3 or 4; Si is silicon; and O is oxygen.

Specific examples of R groups for substitution in the above empirical formula include methyl, ethyl, n-propyl, isobutyl, n-amyl, isoamyl, hexyl, n-octyl, n-dodecyl, and the like; 2-butenyl, 2-methyl, and the like; cyclopentylmethyl, cyclohexylethyl, cyclopentylethyl, methylcyclopentylethyl, 4-cyclohexenylethyl and the like; 2-phenylethyl, 2-phenylpropyl, naphthylethyl, methylnaphthylethyl, and the like; cyclopentyl, cyclohexyl, 2,2,1-bicycloheptyl and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexylphenyl, and the like; aryloxy and alkoxy groups such as methoxy, ethoxy, isobutoxy, n-octyloxy, dodecyloxy, phenoxy, 1,2-naphthoxy, and the like; and halogens such as chlorine and bromine.

Specific examples of compounds conforming to the above empirical formula and which therefore are suitable for the purpose of the present invention are triethylsilane—HSi(C$_2$H$_5$)$_3$;
trimethoxysilane—HSi(OCH$_3$)$_3$;
dibenzylsilane—H$_2$Si(C$_6$H$_5$CH$_2$)$_2$;
triphenoxysilane—HSi(OC$_6$H$_5$)$_3$;
dicyclohexylphenylsilane—HSiC$_6$H$_5$(C$_6$H$_{11}$)$_2$;
cyclohexylmethoxysilane—H$_2$Si(C$_6$H$_{11}$)OCH$_3$;
monochlorosilane—H$_3$SiCl;
diethoxymonochlorosilane—HSiCl(OC$_2$H$_5$)$_2$;
methylmonobromosilane—H$_2$SiBrCH$_3$;
tri-n-propylsilane—HSi(n-C$_3$H$_7$)$_3$;
methyldiethylsilane—HSi(C$_2$H$_5$)$_2$CH$_3$;
cyclic alkyl hydrogen silicones such as (CH$_3$HSiO)$_3$ and (CH$_3$HSiO)$_6$; and linear alkyl hydrogen silicones such as

and

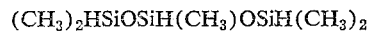

The catalyst of the present invention is formed when the product of the metathetical reaction (as described above) of hydroxyl groups in the surface of carbon black and a halide-type compound of a metal of Groups IVa, Va, VIa, VIIa, or period 4 of Group VIII is heated in an inert environment in the presence of a silane compound to a temperature above about 100° C. and preferably above about 140° C. for a period of at least about 1 hour. At higher temperatures, shorter periods of time suffice. At lower temperatures, the formation of the catalyst either does not occur at all or does not proceed to completion as will readily be seen hereinafter in the examples. Temperatures above about 250° C. are normally unnecessary.

Using the catalysts of this invention, polymerization of the monoolefin and di-olefin monomers can be accomplished in the absence of liquids (other than the monomers themselves), solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are generally suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also members of the aromatic hydrocarbon series, such as ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable.

The proportion of surface reacted carbon black to silane compound utilized in preparing the catalyst is not usually a critical feature of the process. We have found that a molar ratio of from 0.1 to 5 millimols of the silane compound per atom of transition metal chemically combined with the surface of the carbon black is to be preferred.

The quantity of catalyst, i.e., comprising both the surface reacted carbon black and the silane compound, to be utilized in the polymerization reaction may vary, but in general, the total quantity of catalyst that need be employed based on the weight of the charging stock is very small particularly when a very fine particle size carbon black is utilized.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired result.

There follow a number of illustrative non-limiting examples:

*Example 1*

To a 2000 milliliter, three neck, glass reaction vessel equipped with a stirrer, a condenser and nitrogen inlet and outlet tubes, there is added 20 grams of "supercarbovar," a channel carbon black produced by Cabot Corp., which has an average particle diameter of about 14 millimicrons and a hydroxyl group content on the surface thereof of about 1.6 milliequivalents per gram. To said reaction vessel there is added 1800 milliliters of benzene and the resulting slurry is dried by being heated to, and maintained at, the boiling point of benzene, i.e., about 80° C., for about 24 hours. A water/benzene azeotrope is then removed from the reaction vessel by periodic distillation until about 600 milliliters of distillate has been removed. The vessel is then cooled and charged with 20 millimoles of titanium tetrachloride. The resulting slurry is then refluxed for 8 hours with continuous stirring while the HCl produced is removed by a stream of dry nitrogen. Subsequently, the extent of the reaction between the titanium tetrachloride and the hydroxyl groups on the carbon black is determined by measuring the quantity of HCl that was produced and by testing the liquid contents of the vessel for the absence therein of titanium tetrachloride, and the said carbon black is found to have 20 milliatoms of titanium chemically bound to the surface thereof. A sample of 60 milliliters of this slurry containing about 1 milliatom of titanium bound to the surface of about 1 gram of carbon black, is then transferred from this reaction vessel to a liter autoclave which has been previously flushed with dry nitrogen. Next, 2 millimoles of diethylsilane is added to the autoclave and the autoclave is pressurized to 1400 p.s.i. with ethylene. The autoclave is then continuously agitated and heated to and maintained at, about 80° C. for about 1 hour while the pressure therein is maintained at about 1400 p.s.i. by the intermittent introduction of additional ethylene. The reaction products are analyzed and it is found that no solid polymer of ethylene has been formed.

*Example 2*

This example is a duplicate of Example 1 except that the autoclave is not immediately pressurized with ethylene after the introduction thereinto of the diethylsilane. Instead, the bomb is first heated to, and maintained at, about 150° C. for about 1.5 hours while being continuously agitated. After being allowed to cool to about 80° C. at which temperature the bomb is thereafter maintained, the bomb is pressuried to, and maintained at, 1400 p.s.i. with ethylene for 1 hour. The reaction products are analyzed and it is found that about 60 grams of polyethylene having a density of about 0.96 has been produced. The polymer product is found to have a crystalline melting point of about 130–135° C. It is further found that none of the ethylene has been converted to a normally liquid product.

When under the same conditions either the diethylsilane or the carbon black cocatalyst carrying titanium chemically combined to the surface thereof is utilized alone as the catalyst no polymer is produced.

*Example 3*

To a 100 cc. stainless steel bomb, there is added about 60 milliliters of the cocatalyst slurry produced in Example 1 which contains about 1 milliatom of titanium bound to the surface of about 1 gram of carbon black. The procedure of Example 2 is then followed precisely except that propylene is utilized instead of ethylene. The contents of the bomb are analyzed and it is found that solid polypropylene has been formed.

*Example 4*

To a 1000 milliliter, three neck, glass reaction vessel there is added 10 grams of "Vulcan 9," a furnace carbon black produced by Cabot Carbon Co., and having an average particle size of about 20 millimicrons and a hydroxyl group content on the surface thereof of about 0.05 milliequivalents per gram. Said reaction vessel is then placed in a vacuum drying oven heated to a temperature of about 110° C., for about twelve hours. Subsequently, the vessel is sealed without exposing said carbon black to the atmosphere and there is charged to said vessel 0.5 millimoles of vanadium oxychloride and 500 milliliters of isooctane. The vessel is then heated to, and maintained at, the refluxing temperature of isooctane for a period of 4 hours, while the HCl produced is continuously removed by sweeping the reactor vessel with purified nitrogen. Subsequently, the extent of the reaction between the carbon black and the vanadium oxychloride is determined by measuring the quantity of HCl removed from the vessel by the nitrogen stream, and by testing the liquid contents of the vessel for the absence therein of vanadium oxychloride and the said carbon black is found to have a total of 0.5 milliatoms of vanadium on the surface thereto. 5 grams of this carbon black containing about 0.25 milliatoms of vanadium on the surface thereof, and suspended in about 250 milliliters of isooctane is then transferred from this reaction vessel to a one liter stirred autoclave which has been previously flushed with dry nitrogen. Next, 1 millimole of dimethoxymonochlorosilane and 400 ccs. of butadiene are added to the autoclave. The autoclave is then continuously agitated and heated to, and maintained at, about 145° C. for about 2 hours. The reaction products are analyzed and it is found that about 18 grams of solid polybutadiene has been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as additional carbon black or silica, extenders, plasticizers, pigments, insecticides, fungicides, etc., can be incorporated into the polymers.

Obviously many changes may be made in the above described examples and procedure without departing from the scope of the invention. For example, although only chlorides are mentioned in the above examples, transition metal bromides, iodides and fluorides are also suitable for the purposes of the present invention. For example, titanium tetrafluoride is entirely suitable.

Accordingly, it is intended that the above disclosure be regarded as illustrative and as in no way limiting the scope of the invention.

What we claims is:

1. A process for polymerizing a substance chosen from the group consisting of a mono-olefin, mixtures of mono-olefins, a di-olefin, mixtures of di-olefins, and mixtures thereof which comprises contacting said substance at temperatures between about −25° C. and 250° C. with a catalyst comprising (a) carbon black having an average particle diameter of less than about 0.1 micron and carrying in chemical combination on the surface thereof at least about $5 \times 10^{-4}$ equivalents per gram of structures conforming to the formula $$TO_aX_b$$

wherein T is a metal chosen from the group consisting of the metals of Groups IVa, Va, VIa, VIIa and period 4 of Group VIII; O is oxygen; $a$ is a number from 0 to 1; each X is any halogen; $b$ is a number from 1 to 6; and where said structures are chemically linked directly from T to at least one oxygen atom in the surface of the carbon black, and (b) a compound conforming to the formula $$R_nH_mSiO_{\frac{4-(m+n)}{2}}$$

wherein each R is chosen from the group consisting of monovalent hydrocarbon radicals, monovalent alkoxy radicals, monovalent aryloxy radicals and the halogens; $n$ is a number from 0 to 3; each H is a hydride radical; $m$ is a number from 1 to 4; Si is silicon; and O is oxygen.

2. The process of claim 1 wherein the substance to be polymerized is ethylene.

3. The process of claim 1 wherein the substance to be polymerized is propylene.

4. The process of claim 1 wherein the substance to be polymerized is butene-1.

5. The process of claim 1 wherein the substance to be polymerized is a di-olefin.

6. A catalyst comprising (a) carbon black having an average particle diameter of less than about 0.1 micron and carrying in chemical combination on the surface thereof at least about $5 \times 10^{-4}$ equivalents per gram of structures conforming to the formula $$TO_aX_b$$

wherein T is a metal chosen from the group consisting of the metals of Groups IVa, Va, VIa, VIIa and period 4 of Group VIII; O is oxygen; $a$ is a number from 0 to 1; each X is any halogen; $b$ is a number from 1 to 6; and where said structures are chemically linked directly from T to at least one oxygen atom in the surface of the carbon black, and (b) a compound conforming to the formula $$R_nH_mSiO_{\frac{4-(m+n)}{2}}$$

wherein each R is chosen from the group consisting of monovalent hydrocarbon radicals, monovalent alkoxy radicals, monovalent aryloxy radicals, and the halogens; $n$ is a number from 0 to 3; each H is a hydride radical; $m$ is a number from 1 to 4; Si is silicon; and O is oxygen.

7. The catalyst of claim 6 wherein in the formula $$TO_aX_b$$

$a$ is 0 and $b$ is 4.

8. The catalyst of claim 6 wherein in the formula $$TO_aX_b$$

$a$ is 0 and $b$ is 3.

9. The catalyst of claim 6 wherein in the formula $$TO_aX_b$$

T is a metal of Group IVa.

10. The catalyst of claim 6 wherein in the formula $$TO_aX_b$$

T is titanium, $a$ is 0, each X is chlorine and $b$ is 3.

11. The catalyst of claim 6 wherein in the formula $$TO_aX_b$$

T is a metal of Group Va.

12. The catalyst of claim 6 wherein in the formula $$TO_aX_b$$

T is a metal of Group VIa.

13. The catalyst of claim 6 wherein in the formula $$TO_aX_b$$

T is a metal of Group VIIa.

14. The catalyst of claim 6 wherein in the formula $$TO_aX_b$$

T is a metal of Group VIII.

15. The catalyst of claim 6 wherein said carbon black comprises channel carbon black.

16. The catalyst of claim 6 wherein the compound conforming to the formula $$R_nH_mSiO_{\frac{4-(m+n)}{2}}$$

is a trialkylsilane.

17. The catalyst of claim 6 wherein the compound conforming to the formula $$R_nH_mSiO_{\frac{4-(m+n)}{2}}$$

is a dialkylsilane.

18. The catalyst of claim 6 wherein the compound conforming to the formula $$R_nH_mSiO_{\frac{4-(m+n)}{2}}$$

is a chlorosilane.

References Cited in the file of this patent

UNITED STATES PATENTS

| | | |
|---|---|---|
| 2,406,477 | Solomon et al. | Aug. 27, 1946 |
| 3,008,949 | Langer et al. | Nov. 14, 1961 |
| 3,054,754 | Lasky | Sept. 18, 1962 |

FOREIGN PATENTS

| | | |
|---|---|---|
| 569,387 | Belgium | Jan. 12, 1959 |